(12) United States Patent
Sakuma et al.

(10) Patent No.: US 6,808,215 B2
(45) Date of Patent: Oct. 26, 2004

(54) BUMPER APPARATUS FOR VEHICLE

(75) Inventors: Katsuji Sakuma, Nagoya (JP); Shinichi Haneda, Anjo (JP); Kiyoichi Kita, Toyota (JP); Kazunari Azuchi, Himi (JP); Taku Matsutani, Toyama-ken (JP)

(73) Assignees: Aisin Seiki Kabushiki Kaisha, Kariya (JP); Aisin Keikinzoku Kabushiki Kaisha, Shinminato (JP)

( * ) Notice: Subject to any disclaimer, the term of this patent is extended or adjusted under 35 U.S.C. 154(b) by 0 days.

(21) Appl. No.: 10/694,817

(22) Filed: Oct. 29, 2003

(65) Prior Publication Data

US 2004/0135382 A1 Jul. 15, 2004

(30) Foreign Application Priority Data

Oct. 29, 2002 (JP) ........................................ 2002-314306

(51) Int. Cl.[7] .............................................. B60R 19/02
(52) U.S. Cl. ........................................ 293/102; 293/133
(58) Field of Search ................................ 296/102, 116, 296/117, 120, 121, 122, 131, 133, 104, 155

(56) References Cited

U.S. PATENT DOCUMENTS

| 4,328,986 | A | * | 5/1982 | Weller et al. ................ 293/120 |
| 6,059,331 | A | * | 5/2000 | Mori ............................ 293/133 |
| 6,209,934 | B1 | * | 4/2001 | Sakuma et al. .............. 293/120 |
| 6,334,638 | B1 | * | 1/2002 | Yamamuro et al. ......... 293/133 |
| 6,343,820 | B1 | * | 2/2002 | Pedersen ..................... 293/102 |
| 6,485,072 | B1 | * | 11/2002 | Werner et al. .............. 293/132 |
| 6,502,874 | B2 | * | 1/2003 | Kajiwara et al. ........... 293/133 |
| 6,511,109 | B1 | * | 1/2003 | Schultz et al. .............. 293/120 |
| 6,609,740 | B2 | * | 8/2003 | Evans ......................... 293/121 |
| 6,712,411 | B2 | * | 3/2004 | Gotanda et al. ............ 293/155 |

FOREIGN PATENT DOCUMENTS

JP    7-215146 A    8/1995

* cited by examiner

*Primary Examiner*—D. Glenn Dayoan
*Assistant Examiner*—Greg Blankenship
(74) *Attorney, Agent, or Firm*—Burns, Doane, Swecker & Mathis, L.L.P.

(57) ABSTRACT

According to the current invention, a bumper apparatus for vehicle comprises a bumper reinforcement made of an extruded aluminum base alloy material being formed in cross-section having two separated vertical portions, an upper horizontal rib, an intermediate horizontal rib, and a lower horizontal rib provided therebetween, each end of the upper, intermediate and lower horizontal ribs are connected to upper portions, middle portions and lower portions of the vertical portions respectively. In this configuration, the thickness of the intermediate rib is thicker than the thicknesses of the upper rib and the lower rib to make the upper rib and the lower rib be buckled to deform earlier than the intermediate rib when load is applied to the bumper apparatus, and the thickness of the intermediate rib is not more than to make a strength of the bumper apparatus be over a vehicle body tolerable force. Thus, an impact energy is absorbed by deforming the upper rib and the lower rib, the intermediate plate member, the crush box in order, and finally the intermediate rib.

7 Claims, 5 Drawing Sheets

BUMPER APPARATUS FOR VEHICLE

This application is based on and claims priority under 35 U.S.C. §119 with respect to Japanese Application No. 2002-314306 filed on Oct. 29, 2002, the entire content of which is incorporated herein by reference.

FIELD OF THE INVENTION

This invention generally relates to a bumper apparatus for vehicle. More particularly, the present invention pertains to a bumper apparatus for vehicle including an improved bumper reinforcement.

BACKGROUND OF THE INVENTION

Known bumper apparatuses, assembled to the front and/or the rear portions of the vehicle, include bumper reinforcements extending in vehicle width direction for absorbing an impact energy transmitted to the vehicle body as much as possible for minimizing a damage to driver upon vehicle collision at the front portion or the rear portion of the vehicle. The bumper apparatuses assembled to the front and/or the rear portions of the vehicle include energy absorbers made of elastic material (urethane form etc.) which mainly serve as protecting a pedestrian, bumper reinforcements supporting the energy absorbers and being adapted to deform their shapes for absorbing the large impact energy, and crush boxes or bumper stays for fixing the bumper reinforcements to vehicle body members (e.g. side members).

The bumper reinforcement has much contribution to absorbing the large impact energy upon vehicle collision at the front portion or the rear portion of vehicle.

The bumper reinforcement is made by extruding the aluminum base alloy material instead of steel material to lighten the weight of the vehicle for improving fuel economy. An example of such known bumper apparatus is disclosed in the Japanese Unexamined Patent Publication No. H(Heisei) 7-215146.

The known bumper reinforcement made of extruded aluminum base alloy material to be shaped in cross-section having two separated vertical portions and upper, intermediate and lower horizontal ribs of same thickness provided therebetween. Each end of the upper, intermediate and lower horizontal ribs is connected to upper portions, middle portions and lower portions of the vertical portions respectively.

The known bumper apparatus, wherein the bumper reinforcement is fixed to the side member of the vehicle side through the intermediate plate members, absorbs the impact energy upon vehicle collision by buckling to deform the three horizontal portions (ribs) equally and at the same time.

As described above, the bumper reinforcement including three horizontal portions (ribs) of the same thickness absorbs the impact energy upon vehicle collision by buckling to deform the three horizontal portions (ribs) at the same time, however, a load curve relative to stroke significantly decreases as the bumper reinforcement moves toward the end of the buckling movement. Thus, this configuration shows poor efficiency of absorbing impact energy.

To improve the inefficiency, thicknesses of each portion of the bumper reinforcements may be enhanced, however, thicker bumper reinforcement is unfavorable due to causing increasing in vehicle weight and decreasing in fuel efficiency.

Accordingly, it is an object of the present invention to solve these problems of the aforementioned know embodiment.

SUMMARY OF THE INVENTION

According to the current invention, a bumper apparatus for vehicle comprises a bumper reinforcement made by extruding an aluminum base alloy material to be shaped in cross-section having two separated vertical portions and upper, intermediate and lower horizontal ribs provided therebetween. Each one end of the upper, intermediate and lower horizontal ribs are connected to an upper portion, a middle portion and a lower portion of one of the vertical portions respectively, and each the other end of the upper, intermediate and lower horizontal ribs are connected to an upper portion, a middle portion and a lower portion of the other of the vertical portions respectively. In this configuration, the thickness of the intermediate rib is set to be 1.2–2.0 times thicker than the thicknesses of the upper rib and the lower rib which have the same thickness. A crush box is fixed to the vehicle body, and one side surface of the bumper reinforcement is fixed to the crush box through an intermediate plate provided therebetween. Thus, an impact energy is absorbed by deforming the upper rib and the lower rib, the intermediate plate member, the crush box in order, and finally the intermediate rib.

BRIEF DESCRIPTION OF THE DRAWING FIGURES

The foregoing and additional features and characteristics of the present invention will become more apparent from the following detailed description considered with reference to the accompanying drawing figures.

DETAILED DESCRIPTION OF THE INVENTION

Figure 1:
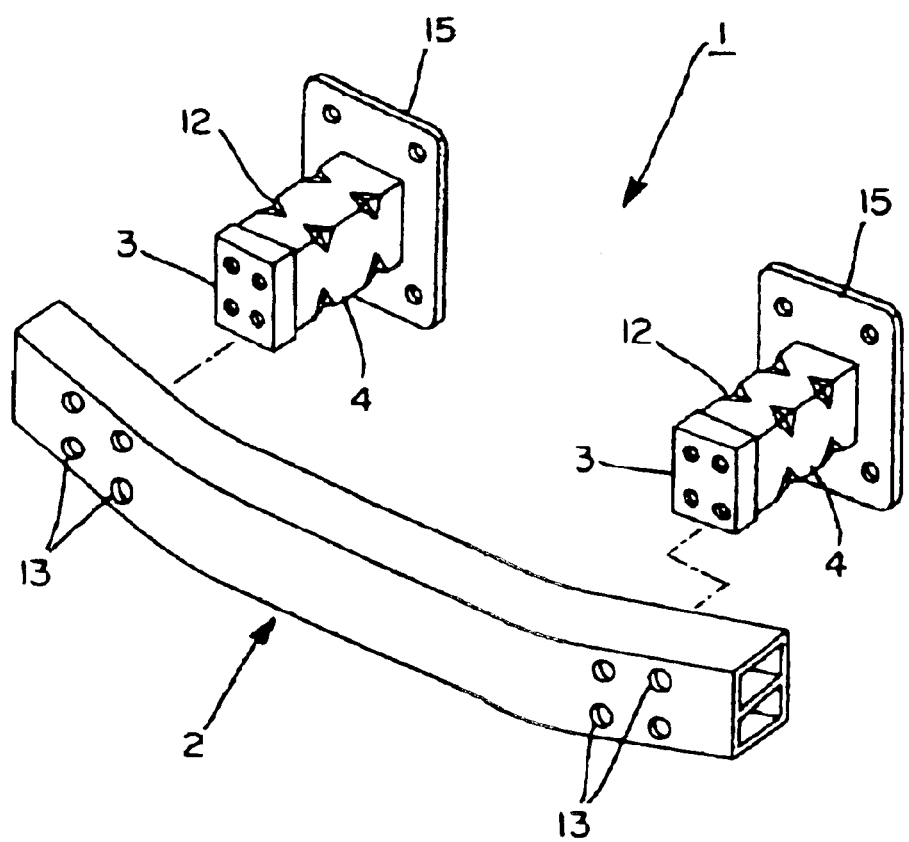
FIG. 1 illustrates an exploded perspective view of the one example of the bumper apparatus according to the invention.

As shown in FIG. 1, a bumper apparatus for a vehicle 1 includes a bumper reinforcement 2 made of an extruded aluminum base alloy material (e.g. A6000 series, A7000 series) extending in the vehicle width direction, and crush boxes 4 fixed to both approximately end portions of the bumper reinforcement 2 through intermediate plate members 3 which are made of steel material. The crush boxes 4 are fixed to the vehicle body member, for example, a side member (shown in FIG. 4), with plate members 15 at the front or the rear of the vehicle body. An energy absorber, made of synthetic resin like urethane and being applied to the bumper reinforcement 2, is omitted in FIG. 1.

Figure 2:
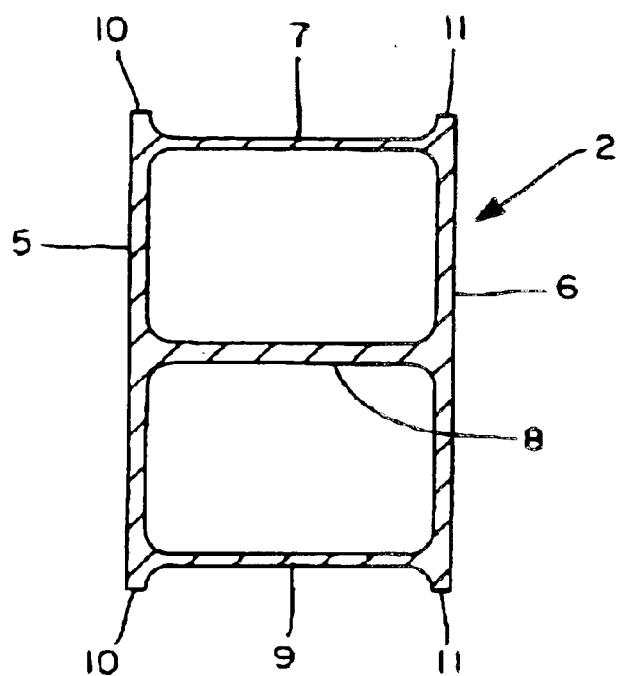
FIG. 2 illustrates a cross-sectional view of one example of the bumper reinforcement.
Figure 3:
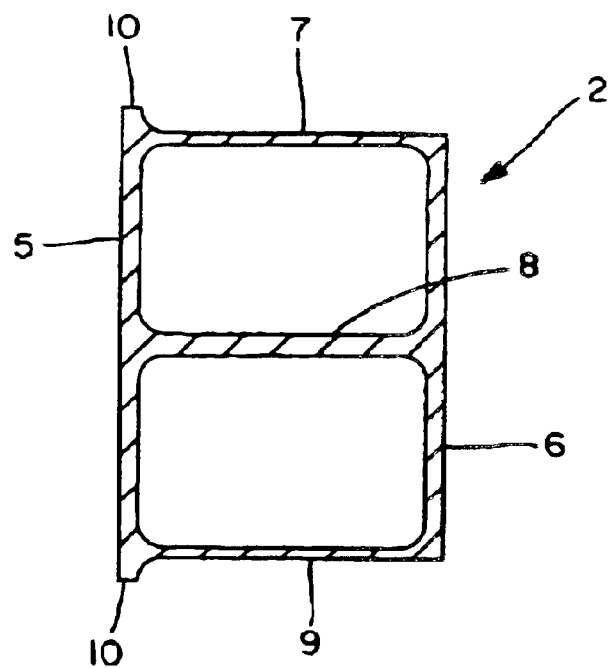
FIG. 3 illustrates a cross-sectional view of another example of the bumper reinforcement.

An example of a cross-sectional view of the bumper reinforcement 2 is shown in FIG. 2 and FIG. 3. The bumper reinforcement 2 includes a pair of separated vertical portions 5, 6 and three ribs 7, 8, 9 therebetween for connecting the pair of separated vertical portions 5, 6.

The thickness of the intermediate rib 8 is 1.2–2.0 times thicker than the thickness of the upper rib 7 and the lower rib 9, preferably, 1.5–3.0 times thicker than the thickness of the upper rib 7 and the lower rib 9.

Each end of the upper, intermediate and lower horizontal ribs 7, 8,. 9 are connected to an upper portion, middle portions and lower portions of the vertical portions 5 respectively. The ribs 7, 8, 9 and the vertical portions 5,6 are connected by smooth arc surfaces to avoid stress concentration.

Flange portions 10, 11 are formed on the upper and lower portions of the vertical portions 5, 6 projecting from the upper rib 7 in upper direction and from the lower rib 9 in lower direction.

The flange portions at the upper and lower portions of the vertical portion 6 may be omitted as shown in FIG. 3. The flange portions at the upper and lower portions of both vertical portions 5, 6 may also be omitted.

The crush boxes 4 are comprised of hollow members made by press molding steal plates with a rectangular or hexagonal polygon shape in cross-section. Plural beads 12 are formed at the corners of the hollow members. The bead 12 is adapted to control the crush boxes 4 to be buckled to deform and control the direction of the deformation.

The bumper reinforcement 2 is fixed to the intermediate members 3 through assembling holes 13 with bolts.

Figure 4:
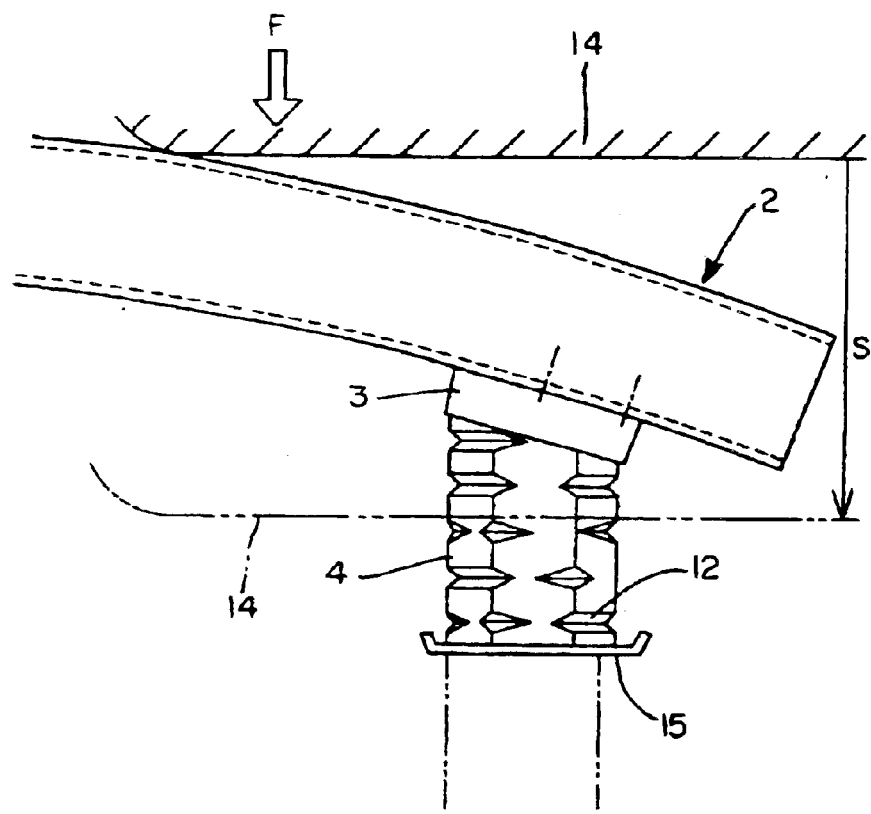
FIG. 4 illustrates a plain view of a part of the bumper reinforcement showing how a load is applied to the bumper reinforcement upon a barrier test.

The bumper reinforcement 2, fixed to side member through the intermediate member 3, is tested to examine deformation characteristics of each members when a load F is applied by a barrier 14 moving with a stroke of S toward the bumper reinforcement 2 as shown in FIG. 4.

An embodiment A, an embodiment B, and a comparable example C C have been tested. The thickness of the intermediate rib 8 of the bumper reinforcement 2 is set to 2.4 mm, and the upper rib 7 and lower rib 9 are set to 2.0 mm in the embodiment A. The thickness of the intermediate rib 8 of the bumper reinforcement is set to 4.0 mm, and the upper rib 7 and lower rib 9 are set to 2.0 mm in the embodiment B. The thickness of the intermediate rib 8 of the bumper reinforcement 2 and the upper rib and lower rib 9 are all set to 2.0 mm in the comparable example C.

The intermediate plate members 3 are welded to the end portions of the crush boxes using steel plates of 2 mm in thickness.

Figure 5:
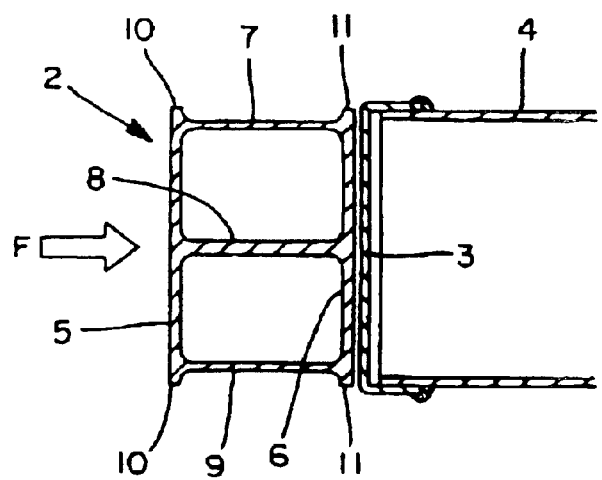
FIG. 5 illustrates a cross-sectional view of an initial condition when the load is applied to the bumper apparatus.
Figure 6:
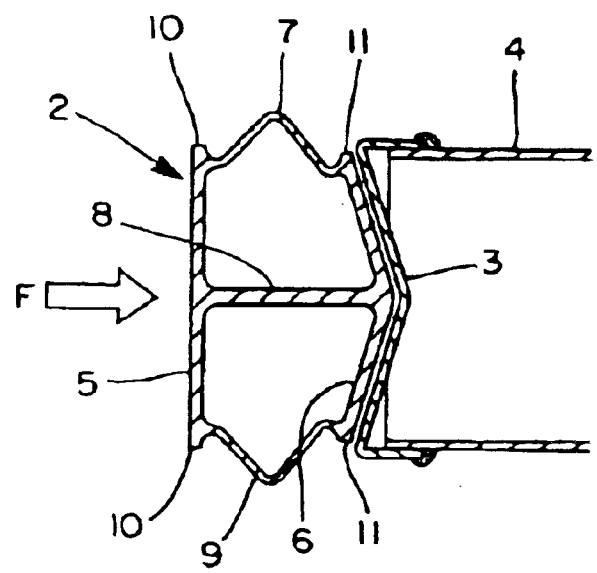
FIG. 6 illustrates a cross-sectional view showing how an upper and a lower ribs of the bumper reinforcement deform.

The each member deformation characteristics in the embodiment A and B will be explained with reference to FIG. 5 through FIG. 8. FIG. 5 shows the initial condition of the bumper apparatus for the vehicle when the load F is applied. As shown in FIG. 6, when load F is applied to the bumper reinforcement 2, the upper rib 7, the lower rib 9, the middle portion of the vertical portion 6 and the intermediate plate members 3 are buckled to deform. This stage is shown as a range $S_1$ in FIG. 9. A high load curve relative to the stroke (shown in a solid line) is obtained within the range $S_1$.

Figure 7:
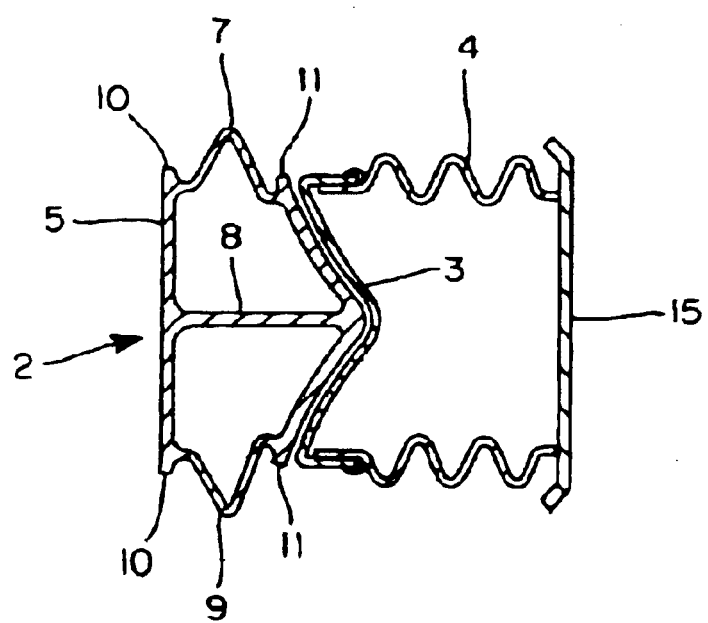
FIG. 7 illustrates a cross-sectional view of an initial condition of a crush box when an intermediate rib is about to be buckled to deform.
Figure 8:
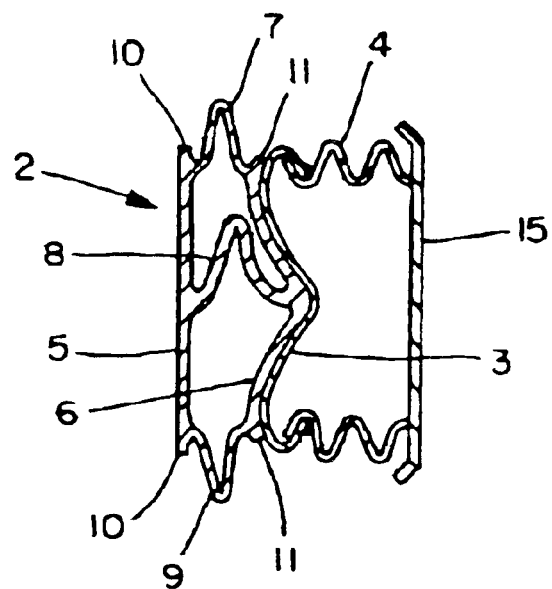
FIG. 8 illustrates a cross-sectional view of the deformed crush box.
Figure 9:
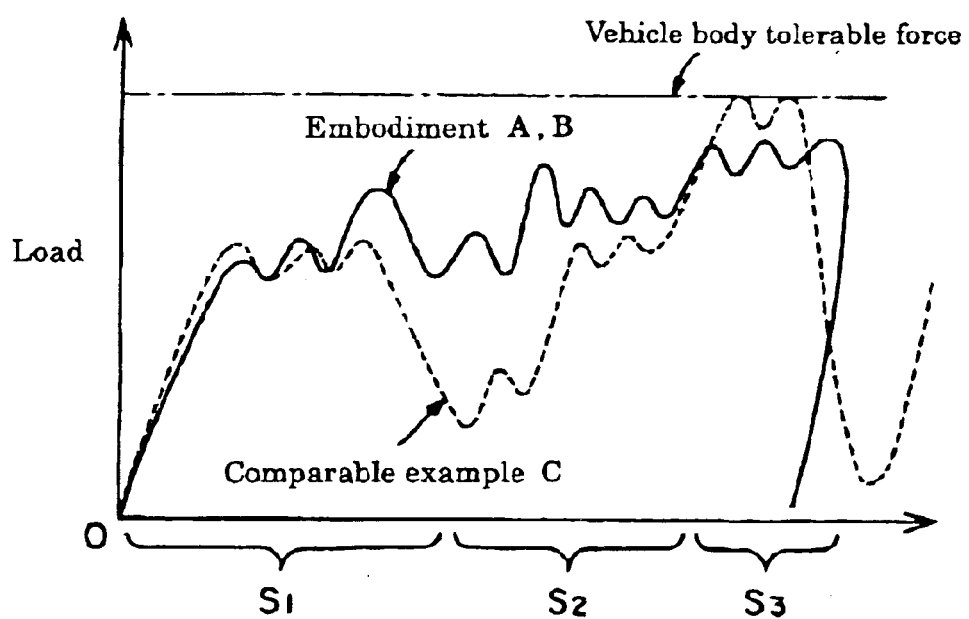
FIG. 9 illustrates a graph showing a relationship between stroke and load values.

Then, the crush box 4 starts to be buckled to deform (shown in FIG. 7). This step is shown as a range $S_2$ in FIG. 9. As shown in FIG. 9, the impact energy absorption characteristics within range $S_2$ indicates a high load curve relative to the stroke (shown in the solid line). As the crush box 4 is further buckled, the intermediate rib 8 starts to be buckled (shown in FIG. 8). This stage is shown as a range $S_3$ in FIG. 9.

As shown in the solid line in FIG. 9, the load curve of the embodiment A and B maintains at high value without significant decrease within the range $S_1$, $S_2$ and $S_3$.

On the other hand, a result of the comparable example C shows significant decrease as shown in solid line in FIG. 9 within the range $S_1$ in which the upper rib, the lower rib and the intermediate rib are buckled to deform at the same time. Then the crush box 4 is buckled to deform after the upper, lower and intermediate ribs are buckled at the same time. The load curve during this step is shown in solid line within $S_2$ and $S_3$ in FIG. 9.

According to the comparison shown in FIG. 9, the bumper apparatus for vehicle according to the current invention, wherein the thickness of the intermediate rib 8 is 1.2–2.0 times thicker than the thickness of the upper rib 7 and the lower rib 9, is able to perform a high level absorption of the impact energy without a decline of the load curve as shown in comparable example C in FIG. 9.

If the thickness of the intermediate rib 8 is equal to or less than 1.2 times the thickness of the upper rib 7 and the lower rib 9, a load curve becomes approximately the same as the load curve of the comparable example C shown in dashed line in FIG. 9. If the thickness of the intermediate rib 8 is equal to or more than twice the thickness of the upper rib 7 and the lower rib 9, a load curve becomes equal to or more than the tolerable force of the vehicle body (vehicle body tolerable force).

The bumper reinforcements as these test members in the embodiment A, the embodiment B and the comparable example C are made of A7000 series aluminum base alloy material, and these test members are exactly the same in size and form except the thickness of the intermediate ribs. The test apparatuses used in the each test of the embodiment A, the embodiment B and the comparable example C shown in FIG. 4 include the same intermediate plate members 3 and the crush boxes 4.

According to the invention, when the impact energy load is applied to the bumper apparatus, the upper and lower ribs are buckled, and the intermediate rib distorts the intermediate plate member and the center portion of one vertical portion at the same time. Then the crush box is buckled to deform, and finally the intermediate rib is buckled to deform. Thus, it is possible to obtain the bumper apparatus having the high-level absorbing ability of the impact energy without the decrease of the load which is seen in the known bumper apparatus.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A bumper apparatus for a vehicle comprising a bumper reinforcement made of extruded aluminum base alloy material being formed in a cross-section having two separated vertical portions, a horizontal upper rib, an intermediate horizontal rib and a lower horizontal rib provided therebetween, each end of the upper, intermediate and lower horizontal ribs being connected to upper portions, middle portions and lower portions of the vertical portions respectively, wherein a thickness of the intermediate rib is thicker than thicknesses of the upper rib and the lower rib, the upper rib and the lower rib buckling earlier than the intermediate rib when load is applied to the bumper apparatus, and the thickness of the intermediate rib is less than a predetermined amount so that a strength of the bumper apparatus is less than a vehicle body tolerable force.

2. A bumper apparatus for the vehicle according to claim 1, thickness of the intermediate rib is 1.2–2.0 times thicker than the thicknesses of the upper rib and the lower rib.

3. A bumper apparatus for the vehicle according to claim 1, wherein the upper rib and the lower rib have the same thickness.

4. A bumper apparatus for the vehicle according to claim 1, wherein a crush box is fixed to a vehicle body, and one side surface of the bumper reinforcement is fixed to the crush box through an intermediate plate provided therebetween.

5. A bumper apparatus for the vehicle according to claim 2, wherein a crush box is fixed to a vehicle body, and one side surface of the bumper reinforcement is fixed to the crush box through the intermediate plate provided therebetween.

6. A bumper apparatus for vehicle according to claim 4, wherein an impact energy is absorbed by deforming the upper rib and the lower rib, the intermediate plate member, the crush box in order, and finally the intermediate rib.

7. A bumper apparatus for vehicle according to claim 5, wherein the impact energy is absorbed by deforming the upper rib and the lower rib, the intermediate plate member, the crush box in order, and finally the intermediate rib.

* * * * *